United States Patent [19]

Brown

[11] Patent Number: 4,866,988
[45] Date of Patent: Sep. 19, 1989

[54] CAPACITIVE PRESSURE TRANSDUCER

[75] Inventor: Neil L. Brown, Falmouth, Mass.

[73] Assignee: EG&G International, Inc., Catamut, Mass.

[21] Appl. No.: 251,894

[22] Filed: Sep. 30, 1988

[51] Int. Cl.[4] .................................................. G01L 9/00
[52] U.S. Cl. ......................................... 73/702; 73/723
[58] Field of Search ................ 73/702, 717, 718, 723, 73/724; 331/65, 101

[56] References Cited

U.S. PATENT DOCUMENTS

| | | | |
|---|---|---|---|
| 2,668,232 | 2/1954 | Tunick | 331/6 X |
| 3,161,060 | 12/1964 | Kemmer | 73/723 X |
| 3,509,499 | 4/1970 | Schaffner | 331/101 X |
| 4,491,806 | 1/1985 | Reynolds et al. | 331/101 X |

Primary Examiner—Charles A. Ruehl
Attorney, Agent, or Firm—Wolf, Greenfield & Sacks

[57] ABSTRACT

A pressure transducer capable of measuring very high pressures with great accuracy. The transducer includes a metal structure enclosing a volume which forms a resonant cavity to provide the tuning element in a UHF oscillator. The resonant cavity provides an inductance and a variable capacitance, the capacitance being variable as a function of the pressure to be measured. A transistor oscillator is very loosely coupled to the tuned circuit and provides positive feedback to maintain the oscillation. Due to the loose coupling between the transistor and the tune circuit, changes in the input reactance of the oscillator circuit have very little affect on the frequency of the tuned circuit. The frequency varies as a function of the pressure and provides an indication thereof. Two embodiments of the transducer are described. A first embodiment includes two concentric tubes, a section at the center of the outer tube being reduced in diameter to form an annular gap to provide the variable capacitance. A second embodiment includes a flat diaphragm-like member in close proximity to an opposing flat section. The capacitance between the diaphragm and the section is variable in response to an external pressure.

12 Claims, 2 Drawing Sheets

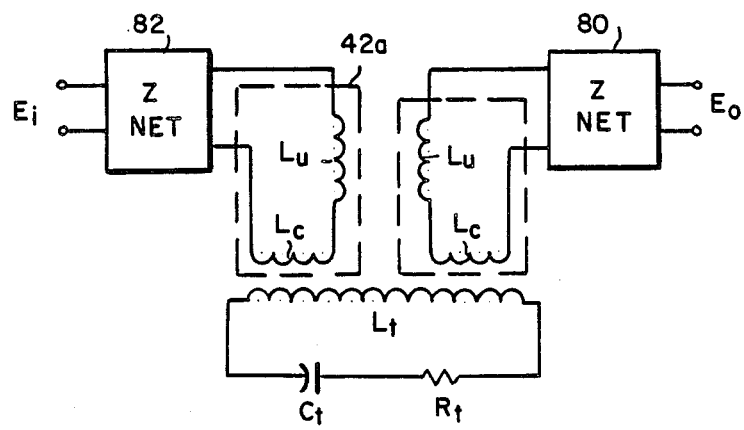
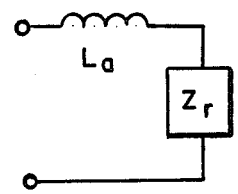
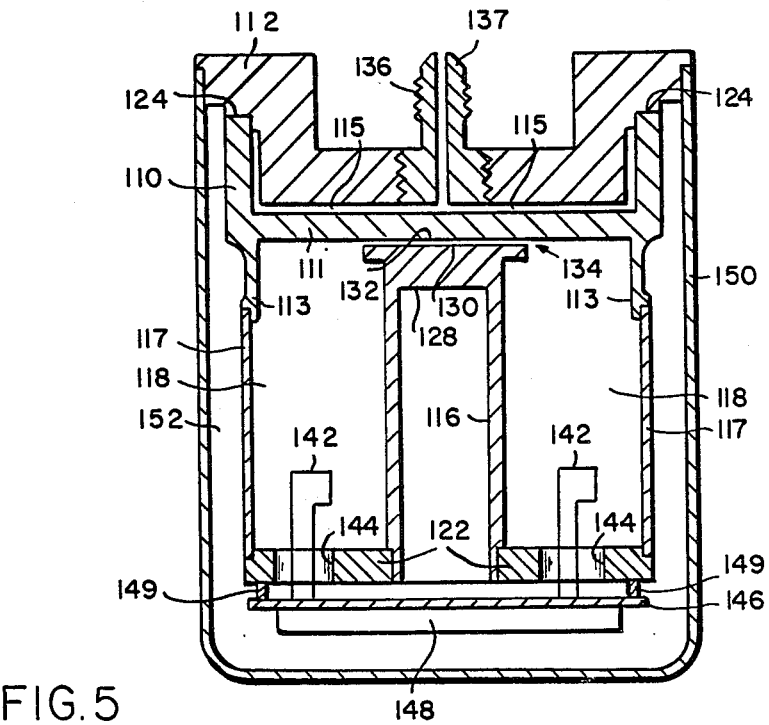

CAPACITIVE PRESSURE TRANSDUCER

FIELD OF THE INVENTION

This invention is related to pressure transducers, and in particular to capacitive pressure transducers having very high accuracy and sensitivity.

BACKGROUND OF THE INVENTION

A large number of different devices have been used for measuring pressure. These devices include, in general, a mechanical element that undergoes a displacement in response to an applied pressure, and a device that senses the magnitude of this displacement. The relationship between the displacement and the applied pressure is a function of the elastic properties of the material from which the mechanical element is made. Errors are introduced into the measurement as a result of physical properties inherent in mechanical devices, including the coefficient of thermal expansion, hysteresis of the material, and the thermo-elastic modulus. Other factors relating to the mechanical sensor include the strength of the sensor, its susceptibility to damage by the environment, and ease of fabrication. Additionally, measurement of high pressures, up to 10,000 pounds per square inch, requires sensors with high strengths. Various devices are commonly used to sense the mechanical displacement in a pressure transducer, including devices utilizing changes in resistance, capacitance, magnetic reluctance, and piezo-electric effects.

Pressure-sensing devices using the change in capacitance between two, opposed, electrically-conductive materials have been proposed. See for example U.S. Pat. No. 3,195,028, for a Capacitance Pressure Gage. Capacitive pressure transducers are typically used to control the frequency of an oscillator, which is advantageous for converting the output to a digital form for further processing. Disadvantages of capacitive pressure gages include the requirement of insulating the capacitive plates from one another, inaccuracies resulting from parasitic capacitances contributed by interconnecting cables and driving circuitry, and errors resulting from hysterisis and elastic creep in the materials from which the transducer is fabricated.

SUMMARY OF THE INVENTION

The present invention includes a novel pressure transducer which can measure very high pressures, up to 10,000 p.s.i. The transducer includes a capacitor which is varied in response to a pressure to be measured and which is used to tune a very high Q inductor in an ultra high frequency (UHF) oscillator. A single transistor oscillator is very loosely coupled to the tuned circuit and provides positive feedback to maintain the oscillation. Due to the loose coupling between the transistor and the tuned circuit, changes in the input reactance of the transistor oscillator circuit have very little effect on the frequency of the tuned circuit. The tuned circuit may be formed entirely of metal, providing a very rugged transducer and eliminating the problems of fabrication and inaccuracies which result from a transducer incorporating dissimilar materials with dissimilar properties.

Two embodiments of the transducer are described. A first embodiment is especially adapted for high pressure measurements and includes two concentric tubes approximately two inches long. The toroidal area between the tubes is enclosed and provides the inductance for the tuned circuit of the UHF oscillator. A short section at the center of the outer tube is reduced in diameter to form an annular gap, the capacitance of which provides substantially all of the capacitance of the tuned circuit pressure to be measured is applied to the inner tube. The diameter of the inner tube changes in response to variations in pressure, changing the capacitance and hence the resonant frequency of the tuned circuit.

A second transducer suitable for measuring lower pressures is disclosed in which pressure is applied to flat, cylindrical plate, forming the top of an annular resonant cavity.

BRIEF DESCRIPTION OF THE DRAWINGS

The operation and advantages of the invention will be more fully understood upon reading the following description of the preferred embodiment by way of example with reference to the associated drawings, of which:

FIGS. 3 and 4 are equivalent circuit diagrams useful in explaining the operation of the present invention; and FIG. 5 shows an alternate embodiment of the invention suitable for use at lower pressures.

DESCRIPTION OF THE PREFERRED EMBODIMENT

Figure 1:
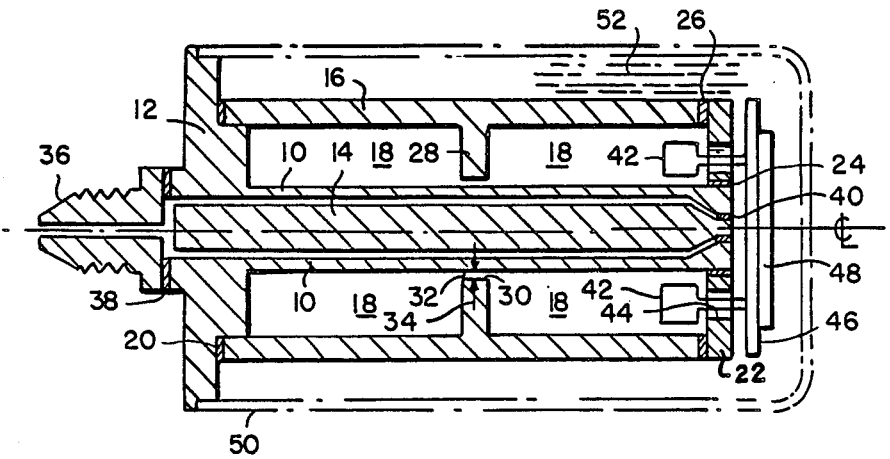
FIG. 1 shows an embodiment of the pressure transducer of the present invention especially suitable for measuring high pressure.

Referring to FIG. 1, there is shown a cross sectional view of one embodiment of the pressure transducer of the present invention. Briefly, the pressure transducer in FIG. 1 includes an inner cylindrical tube coaxially located within an outer tube. A short section at the center of the outer tube is reduced in diameter, resulting in a narrow gap which forms a pressure sensitive capacitance. The pressure to be measured is applied to the inside of the inner tube. In response to changing pressures, the size of the gap, and hence the capacitance, changes.

In FIG. 1, the inner tube includes a long cylindrical tubular section 10 which has integrally formed thereon a top circular flange section 12. The center of inner tube 10 is hollow, and in the preferred embodiment most of this hollow space is filled with a cylindrical plug 14, as described in more detail below. Plug 14 also serves to close off the right-hand end of tube 10 in FIG. 1.

Surrounding inner tube 10 is an outer tube 16 which is positioned coaxially with respect to inner tube 10 to form a toroidally shaped opening 18 therebetween. One end of outer tube 16 is attached to the top flange 12 of inner tube 10 such as by welds 20. The other end of outer tube 16 is attached to a circular base plate 22. Base plate 22 has a circular hole in the center thereof into which the inner tube 10 is inserted and welded as shown by weld 24. The peripheral edge of base plate 22 is welded to the outer tube 16 as shown by weld 26. In this manner, the inner and outer tubes 10 and 16 are rigidly maintained in position with respect to one another.

In the center of outer tube 16 is an inwardly extending segment 28 which runs entirely around outer tube 16 so as to form a disk-shaped protuberance centered within inner tube 10. The inwardly facing surface 30 of segment 28 is parallel to the opposing outer surface 32 of the inner tube 10 and forms a capacitor, as described below. In the preferred embodiment, the separation 34 between surfaces 30 and 32 is on the order of 0.003 inches.

Top flange 12 has a threaded nipple 36 or other suitable connection attached thereto to provide for application of pressure to the inside of inner tube 10. The connection 36 may be welded at location 38 to top flange 12 in the described embodiment. The opposite end of inner tube 10 is closed off so that pressure applied via connection 36 is contained within inner tube 10. In response to varying pressures applied by connection 36, the walls of the inner tube 10 will flex slightly, changing the capacitance between the inner and outer tubes at point 34.

The volume 18 between the inner and outer tubes 10 forms an inductor. Essentially, the two concentric tubes provide a coaxial transmission line shorted at each end. In the preferred embodiment, the inner diameter of outer tube 16 is approximately 1.375 inches. The outer diameter of inner tube 10 is approximately 0.750 inches, and the length from flange 12 to base plate 22 is approximately 2.0 inches. Inner tube 10 has a thickness of 0.125 inches, and outer tube 16 has thickness of 0.09 inches. The cavity 18 appears as an inductor of 2.5 nH in parallel with the capacitance of gap 34. The capacitance of gap 34 varies from 44.1 pF at zero pressure to 51.6 pF at a full scale pressure of 10,000 psi. The calculated Q is approximately 1900. The measured value of Q for one embodiment constructed in accordance with FIG. 1 was approximately 1500. The difference between the measured and calculated values of Q is a result of the surface roughness of the material.

Energy is coupled into and out of the resonant cavity 18 by means of two small loops 42 which function as antennas and which extend into resonant cavity 18 through openings 44 in base plate 22. A printed circuit board 46 is mounted to base plate 44, for example by means of standoffs not shown in the figure. Oscillator circuitry 48, disclosed in more detail below, is mounted to printed circuit board 46 and serves to maintain oscillation in the resonant cavity 18. A connector to circuitry 48, not shown in FIG. 1, provides a means for applying power to the oscillator circuit and providing a frequency output therefrom. A cover 50 may be provided for the transducer shown in FIG. 1, and the space between cover 50 and outer tube 16 may be filled with an insulating material 52. As discussed below, controlling thermal effects increases the accuracy of the transducer, and insulating material 52 maybe provided for that function.

The above described dimensions and construction provides a transducer having a resonant cavity 18 with a resonant frequency of approximately 500 MHz and an impedance of 47,000 ohms at resonance. In the described embodiment, antenna loops 42 have a loop area of 0.072 square inches, a self-inductance of 21 nH and coefficient of coupling of 0.0125 to the transducer inductance. Oscillation at the resonant frequency of the transducer is achieved by amplifying the output of one loop and feeding the amplified output to the second loop to provide positive feedback.

Figure 2:
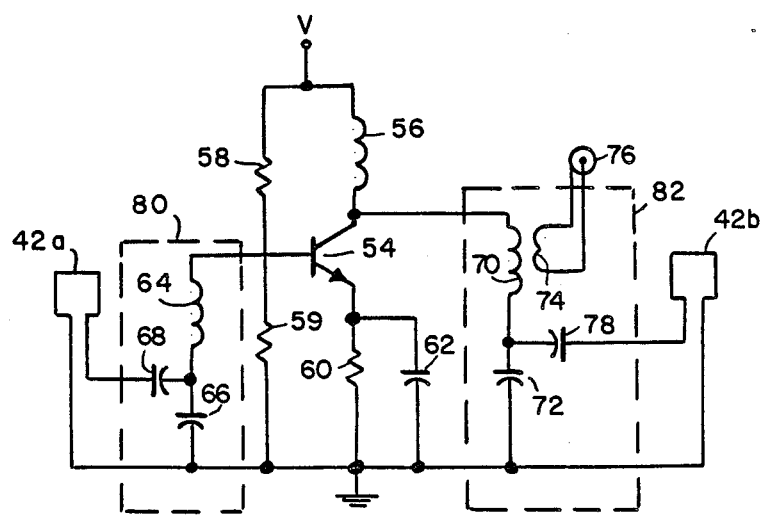
FIG. 2 shows an oscillator circuit suitable for use with the pressure transducer of FIG. 1.

Referring to FIG. 2, there is shown an exemplary oscillator circuit for use with the transducer of FIG. 1. In the circuit of FIG. 2, a power supply voltage is applied to the collector of a transistor 54 via a load inductor 56. Resistors 58 and 59 provide a bias voltage to transistor 54 in conjunction with emitter resistor 60. A bypass capacitor across emitter resistor 60 is used to provide a high gain for the amplifier stage.

The base of transistor 54 is connected to ground through a series-connected tuned circuit including inductor 64 and capacitor 66. Antenna 42a is connected to the junction between inductor 64 and capacitor 66 via a capacitor 68. Capacitors 66 and 68 in conjunction with inductor 64 provide an impedance matching network 80 between antenna 42a and the amplifier circuit, as described in more detail below. The output of the circuit is taken across a series-connected inductor 70 and capacitor 72 connected between the collector of transistor 54 and ground.

A second coil 74 is loosely coupled to coil 70 and provides an output-signal at a jack 76. The second antenna 42b in resonant cavity 18 is connected via capacitor 78 between inductor 70 and ground, as shown in FIG. 2. Inductors 70 and 74 in conjunction with capacitors 72 and 78 serve to provide an impedance matching network 82 between antenna 42b and the transistor amplifier circuit. The following values are suitable for the circuit of FIG. 2 for use with the transducer of FIG. 1:

| | |
|---|---|
| Inductor 56 - 390nH | Inductor 74 - 10nH |
| Inductor 64 - 390nH | Capacitor 72 - 12pF |
| Capacitor 66 - 12pF | Capacitor 78 - 10pF |
| Capacitor 68 - 7pF | Transistor 54 2N6603 |
| Inductor 70 - 27nH | |

Circuit 48 acts as an amplifier circuit having positive feedback therearound. Energy from oscillation in the resonant cavity 18 is coupled into the amplifier circuit 48 via antenna 42a connected to the base of transistor 54. Transistor 54 amplifies any oscillation which appears across load inductor 70. A portion of this amplified energy is coupled back into resonant cavity 18 by antenna 42b to provide positive feedback which will sustain oscillation.

Referring to FIG. 3 there is shown an equivalent circuit of the reactances of antenna 42 and the transducer. In FIG. 3, $E_i$ represents the input voltage taken from the collector circuit of transistor 54 and applied to the resonant cavity 18 through impedance matching network 82 and antenna 42a. Similarly, energy from the resonant cavity 18 is picked up by antenna 42b and applied via impedance matching network 80 to the base circuit of the amplifier as $E_o$.

The impedances of antennas 42 each include two components. The uncoupled component of the antenna impedances is designated as $L_u$ and is given by the equation $L_u = L_a(1-K)$, where $L_a$ equals the antenna impedance and K equals the coefficient of coupling between the antenna impedance and the resonant cavity 18. Each antenna loop also includes the mutual inductance caused by the coupling of the antenna inductance with the resonant cavity inductance. The mutual inductance component $L_m$ is given by $L_m = KL_a*L_t$ where $L_t$ is the inductance of the transducer.

FIG. 4 shows the equivalent circuit of the coupling loops as seen by the circuitry of FIG. 3. The equivalent circuit consists of the self-inductance $L_a$ of each loop in series with the transducer reflected impedance $Z_r$ due to the mutual inductance between the loop and the transducer inductance. The reflected impedance $Z_r$ of the transducer at resonance is on the order of 16 ohms resistive. This value $Z_r$ is comparable to the resistive component of the input impedance of the transistor. The impedance matching networks 80 and 82 are designed to match the impedance of the coupling loop as shown in FIG. 3 to impedances of the base and collector circuits of the oscillator transistor 54.

It is important to note that the value of the reflected transducer impedance, 16 ohms, relative to the actual impedance across the capacitor gap, 11.8K ohms, represents an impedance transformation ratio of approximately 740 to 1. This means that the reflected impedance is equivalent to a parallel capacitance of approximately 740 times the gap capacitance, or 33,000 pF in parallel with an inductor approximately 740 times smaller than the transducer inductance. The common emitter input capacitance of transistor 54 is typically on the order of 5 pF at 500 MHz. This is 6600 times less than the equivalent capacitance of the reflected impedance $Z_r$. As a result, a 10% change in the input capacitance of transistor 54, such as might be caused by changing temperature or supply voltage, will cause a frequency change of only one part in 132,000. In other words, the large transformation ratio made possible by the high Q of the transducer results in an oscillator whose frequency of oscillation is very insensitive to the input and output parameters of the transistor amplifier circuit, even though the actual capacitance across the gap 34 in the transducer, which is 44.1 pF, is only about 9 times the transistor input capacitance.

In the preferred embodiment, inner and outer tubes 10 and 16, flange 12, and inplate 26, are preferably fabricated from a beryllium-copper alloy, such as Alloy 25. This alloy has excellent elastic properties, including low hysterisis and low elastic creep. These two error sources are non-linear and depend on the history of the deformation, and accordingly are difficult to compensate for. Beryllium-copper has a significant temperature coefficient of linear expansion and also an appreciable thermo-elastic modulus. As discussed below, these effects may be compensated for by a simple microprocessor circuit which provides corrective factors in response to a measurement of the transducer temperature.

Although other materials, such as fused quartz and some ceramics have better hysterisis and elastic creep characteristics, these materials are both fragile and difficult to fabricate. The present invention as shown in FIG. 1 includes a transducer in which all the structural parts are fabricated of a single, durable material. The transducer may be manufactured using conventional machining techniques and can be readily electron-beam welded for assembly. Thus, the transducer has the critical mechanical and electrical aspects integrated into a monolithic structure of a single material. This avoids many of the problems and errors associated with other transducers in which a number of different materials, including insulators, must be combined into a single structure.

The major non-linearities between the actual pressure applied to the transducer of FIG. 1 and its output frequency result from temperature effects. These effects are discussed in detail below. As will become clear upon reading the following explanation, the transducer design is such that temperature affects are linear and predictable. By using a thermistor output to provide information regarding the temperature of the transducer, the transducer output may be corrected to provide a very accurate measurement of the pressure applied to the transducer. In the described embodiment, this correction is implemented by means of a microprocessor circuit which is responsive to frequency and temperature data from the transducer.

In the preferred embodiment, the correction algorithm includes a fourth order polynomial equation determined imperically from the transducer response to calibrated inputs. The following equation was found to provide an accuracy of plus or minus 0.004% over a pressure range of 0 to 6000 psi for the transducer of FIG. 1.

$$P = C_0 + C_1 + C_2 F^2 + C_3 F^3 + C_4 F^4$$

where F=frequency, and $C_0$ through $C_4$ are constants.

For maximum accuracy, individual transducers must be calibrated to determine the values of constants $C_0$ through $C_4$. This is done by taking pressure and frequency measurements at a plurality of points covering the pressure range of the transducer and then determining the appropriate coefficient for the equation above. Programs to determine such coefficients are readily available. The following are typical coefficients which were determined for a transducer constructed in accordance with FIG. 1:

$C_0 = -499,732,116$
$C_1 = -4330.99273$
$C_2 = -.01878743$
$C_3 = -1.5634606 \times 10^{-7}$
$C_4 = -2.4609373 \times 10^{-12}$ Beryllium-copper has a linear coefficient of expansion of 17.5 ppm/degree C. Since the inductance and capacitance both increase in direct proportion to the linear dimension and the resonant frequency is inversely proportional to the square root of their product, the frequency shift of the transducer will be minus 17.5 ppm/degree C.

The capacitance is very sensitive to differences in temperature between inner pressure sensing tube 10 and the outer tube 16. This effect results in a temperature coefficient of capacitance which is equal to the linear coefficient of expansion times the ratio of the diameter of the inner tube to the capacitance gap. Thus, with the transducer shown in FIG. 1, the coefficient will be 250 times the linear expansion coefficient of beryllium-copper, or 436 ppm/degree C. The resulting change in capacitance may be compensated for in two ways. First, beryllium-copper has a relatively high conductivity. A modest amount of thermal insulation, such as insulation 52 shown in FIG. 1, will ensure that the internal thermal time constant of the transducer is small compared with the external time constant relative to the external environment. In the embodiment shown in FIG. 1, the external thermal constant is approximately 27 seconds. In situations where the rate of change of temperature of the transducer is large due a very large difference between the transducer and external environment, these effects can be corrected by the microprocessor by the addition of a differential term in the temperature correction algorithm. Experimental results have shown that the appropriate correction algorithm can reduce the effects of rapid external temperature changes to negligible amounts.

Accuracy of the transducer is increased by reducing changes in the temperature of the transducer due to thermal inputs from within the transducer. Plug 14 serves to minimize the amount of fluid within the inner tube 10 of the transducer. This reduces the effects of adiabatic heating or cooling which may occur in the working fluid with changes in pressure. Additionally, the power dissipated by circuitry 48 should be minimized. In the described embodiment, the oscillator circuit dissipates only 12 milliwatts.

Errors may also be introduced into the pressure measurement due to the thermo-elastic modulus of beryllium-copper. This errors is a linear function of the product of the applied pressure and temperature change. Although this error is potentially large, it is also easily corrected for by the correction algorithm.

The complete algorithm to correct for the effects of temperature is as follows:

$$P_{corr'd} = P_{nom} + P_z + P_s + P_d$$

where $P_{nom}$=pressure at reference temperature ; $P_z$=zero temperature shift=$K_o*(T-T_o)$; $P_s$=sensitivity shift due to thermo-elastic modulus=$K_1*P_{nom}*(T-T_o)$; and $P_d$=Shift due to rate of change of temperature=$K_2*dT/dt$.

Referring to FIG. 5 there is shown an alternate embodiment of the transducer of the present invention which has advantages in certain applications. In particular, the embodiment shown in FIG. 5 may be used to provide a more sensitive pressure transducer for pressure ranges less than that for which the FIG. 1 embodiment is suited. In the transducer of FIG. 5, similar components have been designated with numbers having the same last two digits as the components in FIG. 5.

FIG. 5 represents a view taken along a center line of cylindrical pressure transducer, similarly to FIG. 1. In FIG. 5, a cylindrical, cup-shaped diaphragm assembly 110 has a top flange piece 112 welded thereto at locations 124 around the top circumference of the cup-shaped assembly 110. Flange 112 extends into the cup-shaped opening to provide a very small gap 115 which extends across the bottom of the cup-shaped opening and partially up the sides, as shown in FIG. 5. Flange 112 includes a pressure connector 136 which has an opening 137 therein communicating with the gap 115 between flange 112 and diaphragm 110. Pressure connection 136 may be integrally formed as a portion of flange 112 or may be a separate piece which is screwed into or otherwise attached to the flange 112.

The flat, circular, bottom section of assembly 110 forms a diaphragm 111 which deflects downwardly in response to increasing pressures applied to pressure port 136. Located immediately below diaphragm 111 is a plug 128. Plug 128 has a flat top surface 132 which is located in close proximity to the bottom surface 132 of the diaphragm disc 111, as described in more detail below. This forms a very narrow gap 134 between plug 128 and diaphragm 111. The capacitance across this gap is varied by pressure applied to pressure port 137.

The thickness in the vertical direction of top flange 112 is much greater than the thickness of the diaphragm 111. This ensures that essentially all of the deformation which occurs in response to pressure applied to pressure port 137 will be in the flexing of diaphragm 111. Diaphragm assembly 110 includes cylindrical sidewalls 113 extending below the diaphragm 111. Sidewalls 113 are narrowed so that deformations occurring in these sidewalls match deformations occurring in other parts of the transducer.

Plug 128 is mounted to a base plate 122 by means of a tubular section 116. The base plate 122 is connect to diaphragm assembly 110 by means of cylindrical tube 117 that extends from the sidewall portions of the diaphragm assembly 110 to base plate 122. This defines a toroidially shaped resonant cavity 118 within the transducer, as shown in FIG. 5. Two antennas 142 extend through openings 144 in base plate 122 to provide electrical coupling into resonant cavity 118. The antennas 142 are connected to electronic circuitry 148 mounted on a printed circuit board 146. Printed circuit board 146 is attached base plate 122 via stand-offs 149.

The size of gap 134 between plug 128 and diaphragm 111 changes as pressure is applied to the pressure connection 136. The resulting change in capacitance varies the resonant frequency of the microwave resonant cavity 118. Antennas 142 are connected to an oscillator circuit similar to that shown in FIG. 2, and the frequency of oscillation of the circuit provides an output representation of the capacitance of gap 134, and hence the pressure applied to the transducer.

The transducer may be fabricated entirely of a single alloy, preferably the beryllium-copper alloy discussed above. Since the deflection of the transducer is principally within diaphragm 111, other segments of the transducer need not be fabricated of this beryllium alloy, since the good elastic properties of the alloy are not required. By fabricating other portions of the transducer from a higher conductivity material, such as copper, the Q of the transducer may be increased. For example, cylindrical sidewalls 117, base plate 122, and tube and plug section 116 and 128 may be fabricated from copper. The increase in conductivity results in a Q for the transducer of approximately 3,000.

The structure shown in FIG. 5 is particularly adapted to assembling the transducer in a manner to provide very accurate control over the size of gap 134. After top flange 112 has been connected to the diaphragm assembly 111, such as by electron beam welds at 124, the alignment between the top surface 130 of plug 128 and the bottom surface 132 of the diaphragm 111 may be very precisely controlled by lapping the end of tube 117.

In the embodiment shown in FIG. 5, the height of resonant cavity 118 from the top of base plate 122 to the bottom of diaphragm 111 is 2 inches. The inside diameter of the cavity 118 is 2.563 inches, and the outside diameter of tube 116 is 0.75 inches. Tubes 117 and 116 have wall thicknesses of 0.0625 inches. The thickness of diaphragm 111 is 0.1875 inches for a pressure range of 0-1000 psi. The thickness of diaphragm 111 changes as the pressure range changes. The thickness will vary as the cube root of the maximum pressure. The separation between plug 128 and diaphragm 111 at zero pressure is 0.005 inches.

The transducer shown in FIG. 5 is used in a similar fashion to the transducer shown in FIG. 1, and similar error sources exist which are compensated for by applying a correction equation to the frequency of the oscillation. In addition to the above described error sources, the correction equation for the transducer of FIG. 5 may account for the doming action of transducer 111 as opposed to a true piston-like displacement. This effect is known in the art and is described, for example, in Formulas For Stress & Strain, 4th Ed. by Raymond J. Roark, McGraw Hill, 1965.

By matching the thermal expansion coefficient of tubes 116 and 117, the gap 134 may be made relatively independant of the temperature of the transducer. It is, of course, important to keep a uniform temperature throughout the transducer. Adiabatic heating and cooling of the fluid through which the pressure is applied to the transducer can result in errors in the output. Accordingly, the volume of space 115 should be kept as small as possible. By making top flange 112 relatively massive, heat from the pressure transmitting fluid may be more quickly conducted away from the transducer. Insulation material 152 may added around the transducer and protected by means of cover 150. Gravitational affects on diaphragm 111 and plug 128 may be minimized by adjusting thickness of plug 128 so that the sag of diaphragm 111 in response to gravity is matched by a similar sag in the position of plug 128. Gravitational forces orthogonal to the axis of diaphragm 111 (i.e. horizontal forces in FIG. 5) produce negligible effects on the dimension of the gap 134.

A new type of pressure transducer has been described by way of example herein which has advantages over previously known transducers. In applying the invention to different applications, it may be necessary to make modifications to the disclosed embodiments, which modifications are within the ordinary skill of the art. Accordingly, the invention should not be limited by the disclosure herein of exemplary embodiments, but rather should only be interpreted in accordance with the following claims.

What is claimed is:

1. A pressure transducer for measuring the difference between first and second pressure levels, one of which may be an ambient pressure level, comprising:
   a first section;
   a second section cooperative with the first section so as to form a cavity substantially enclosed by the first and second sections so as to form a resonant cavity having an equivalent inductance in parallel with an equivalent capacitance;
   means for rigidly connecting the first and second sections to one another;
   the first and second sections respectively including first and second facing surfaces which are substantially parallel to one another and which are separated by a distance substantially less than the cross-sectional dimensions of the resonant cavity so that the equivalent capacitance of the resonant cavity is substantially determined by the capacitance between the first and second surfaces;
   antenna means, extending into and coupled to the resonant cavity, and adapted for connection to an oscillator circuit, for inducing oscillation within the resonant cavity; and
   means for applying one of the first and second pressures to the interior of the cavity and the other of the pressures to the exterior of the cavity so that the separation between the first and second surfaces varies as the difference between the first and second pressure changes;
   whereby the frequency of oscillation may be used to provide a representation of the difference between the first and second pressures.

2. The transducer of claim 1 wherein the antenna means has a coupling coefficient to said resonant cavity substantially less than unity whereby the effect on the frequency of oscillation of changes in the reactance across the antenna means is reduced.

3. The transducer of claim 2 wherein the first and second sections are made entirely of metal.

4. The transducer of claim 3 wherein the means for connecting includes a metallic bond between the first and second sections.

5. The transducer of claim 2 wherein the first and second sections are made of a material including beryllium and copper.

6. The transducer of claim 2 wherein the first section includes a first tube, the second section includes a second tube coaxially disposed around the first tube, and wherein the transducer further includes end walls connecting the ends of the first and second tubes to provide a toroidially-shaped resonant cavity, between the first and second tubes.

7. The transducer of claim 6 further including a disk-shaped portion attached to and running entirely around one of the tubes and extending into the resonant cavity toward the other of the tubes, the width of the disk-shaped portion along the length of the tubes being substantially less than the length of either tube, to form a ring-shaped space whose thickness is substantially less than the separation between the first and second tubes elsewhere in the resonant cavity.

8. The transducer of claim 7 wherein the first and second sections and the end walls are made entirely of metal.

9. The transducer of claim 8 wherein the means for connecting includes a metallic bond connecting the end walls to the first and second tubes.

10. The transducer of claim 7 wherein the first section has an opening extending along the axis thereof;
    and wherein the transducer further includes:
    means for applying the first pressure to the opening in the first section.

11. The transducer of claim 10 further including means for reducing the volume of the opening in the first section. whereby heat transfer to the transducer from adiabatic heating or cooling of a fluid in the opening in the first section is reduced.

12. The transducer of claim 11 wherein the opening in the first section is generally cylindrical in configuration and wherein the reducing means includes a cylindrical plug coaxially located within the cylindrical opening of the first section to define a cylindrical volume to which the first pressure is applied.

* * * * *